United States Patent [19]

Reinhart

[11] Patent Number: 5,616,569
[45] Date of Patent: Apr. 1, 1997

[54] PET FOOD PRODUCT CONTAINING FERMENTABLE FIBERS AND PROCESS FOR TREATING GASTROINTESTINAL DISORDERS

[75] Inventor: Gregory A. Reinhart, Dayton, Ohio

[73] Assignee: The Iams Company, Dayton, Ohio

[21] Appl. No.: 219,014

[22] Filed: Mar. 28, 1994

[51] Int. Cl.$^6$ .............................. A61K 31/715; A23K 1/18
[52] U.S. Cl. .............................. 514/54; 514/867; 426/630; 426/635; 426/658; 426/805
[58] Field of Search ........................... 424/195.1; 514/23, 514/54, 783, 867; 426/44, 46, 48, 49, 53, 54

[56] References Cited

U.S. PATENT DOCUMENTS 5,294,458  3/1994  Fujimori .................................. 426/635

FOREIGN PATENT DOCUMENTS

| | | |
|---|---|---|
| 0058651 | 8/1982 | European Pat. Off. . |
| 0185511 | 6/1986 | European Pat. Off. . |
| 0345710 | 12/1989 | European Pat. Off. . |
| 2403203 | 7/1975 | Germany . |
| 61-135551 | 6/1986 | Japan . |
| 03061452 | 1/1991 | Japan . |
| 5219896 | 12/1993 | Japan . |

OTHER PUBLICATIONS

Pethick et al. Abstract only→see search copy. *Aust. Vet. J.*, 68(11), pp. 361–363, (1991).
Gedek Abstract Only→see search copy. *Zentralbl. Hyg. Umweltmed.*, 191(2–3), pp. 277–301, (1991).
Glawischnig Abstract Only→see search copy. *DTW Dtsch Tierarztl. Wochenschr.*, 97(1), pp. 48–51, (1990).
Munchow et al. Abstract Only→see search copy. *Arch. Tierernahr*, 38(5), pp. 375–385 & 359–373, (1988).
Barnard et al. Abstract Only→see search copy. *Lab. Animal Sci.*, 38(3), pp. 282–288, (1988).
Sunvold et al.; Fermentability of Selected Fibrous Substrates by Cat Faecal Microfiora; Watham Symposium Sep. 23–25, 1993, p. 97.
Sunvold et al.; Fermentability of Selected Fibrous Substrates by Dog Faecal Microflora; Watham Symposium Sep. 23–25, 1993.
American Society of Animal Science; Journal of Animal Science, vol. 71, Supplement 1, 1993, p. 159.
Reinhart et al.; Dietary Fibre Source and Its Effects on Colonic Microstructure and Histopathology of Beagle Dogs; Waltham Symposium Sep. 23–25, 1993, p. 79.
Sunvold et al.; Fermentability of Various Fibrous Substrates by Canine Fecal Microflora; The FASEB Journal, Mar. 28–Apr. 1, 1993, p. A740.

*Primary Examiner*—John Kight
*Assistant Examiner*—Howard C. Lee
*Attorney, Agent, or Firm*—Killworth, Gottman, Hagan & Schaeff

[57] ABSTRACT

A pet food product and process for treating gastrointestinal disorders are provided. The pet food product contains fermentable fibers which have an organic matter disappearance of 15 to 60 percent when fermented by fecal bacteria for a 24 hour period. The fibers are present in amounts from 3 to 9 weight percent of supplemental total dietary fiber.

16 Claims, No Drawings

PET FOOD PRODUCT CONTAINING FERMENTABLE FIBERS AND PROCESS FOR TREATING GASTROINTESTINAL DISORDERS

BACKGROUND OF THE INVENTION

This invention relates to a pet food composition containing fermentable fibers for maintaining normal gastrointestinal function and ameliorating chronic diarrhea in animals.

Diarrhea is defined as an increase in fecal water content with an accompanying increase in the frequency, fluidity or volume of bowel movements. Also, diarrhea is the primary clinical sign of intestinal disease in the dog and one of the most common presenting signs in veterinary medicine. There are two approaches taken by current commercial pet animal gastrointestinal diets to address the problem. First, some formulas use reduced fiber and fat as methods to alleviate diarrhea. However, these diets do not address the underlying problem. They just limit the nutrients that a compromised gastrointestinal tract may not completely assimilate. This, in turn, lowers the quantity of unprocessed matter excreted by the animal. Therefore, these diets reduce the overt signs of diarrhea, but they do nothing to alleviate the abnormal intestinal conditions of the animal.

The second approach uses formulas containing high quantities of cellulose fiber to overwhelm the gastrointestinal tract with an insoluble fiber. The end product of this approach is an increase in fecal bulk. This approach has the same problem as the low-fat/low-fiber diet approach. Cellulose fiber does nothing to improve the condition of the intestinal tract, it just reduces the overt signs of diarrhea.

Therefore, a need still exists for a pet food composition which actually alleviates the intestinal conditions that produce diarrhea and restores, and then maintains, normal gastrointestinal function.

SUMMARY OF THE INVENTION

The present invention meets that need by providing a pet food product and diet which uses moderate levels of dietary fermentable fibers to provide the intestinal tract with an ample supply of preferred oxidative fuel sources. This novel approach seeks to relieve symptoms of chronic diarrhea by "feeding" the cells which line the gastrointestinal tract of the animal. Epithelial cells, such as enterocytes and colonocytes, depend upon respiratory fuels to maintain cellular turnover and function. These respiratory fuels can either be derived from the bowel lumen or from systemic circulation. Colonocytes derive more than 70% of their energy from lumenal nutrition supplied by short-chain fatty acids (SCFAs).

SCFAs are produced by bacterial fermentation of carbohydrates and are the preferred energy source of colonic epithelial cells. SCFAs are also believed to promote sodium and water absorption, increase colonic blood flow, protect against alterations of electrolyte transport induced by bile acids and stimulate colonic cell proliferation in animals. Also, recent studies involving rats have shown that the presence of SCFAs in the intestine promotes mucosal growth.

This invention takes the novel approach of supplying the intestine with a moderate quantity of SCFAs by providing fermentable fibers which intestinal bacteria use to produce SCFAs. This is achieved using a pet food composition containing fermentable fibers which have an organic matter disappearance of from about 15 to 60 percent when fermented by fecal bacteria in vitro for a 24 hour period. These fibers are present in amounts from 3 to 9 weight percent of supplemental total dietary fiber, preferably 3 to 7 weight percent, and most preferably 4 to 7 weight percent.

By "fermentable fibers," we mean any fiber source which can be fermented by intestinal bacteria present in the animal to produce a significant quantity (over 0.5 mmol of SCFAs/gram of substrate in a 24 hour period) of SCFAs. Some preferred fermentable fibers suitable for use in the present invention are beet pulp, citrus pulp, rice bran, carob bean, gum talha, and mixtures of these fibers, with beet pulp being the most preferred.

This invention can be used to treat the gastrointestinal disorders or maintain the health of any pet animal. However, the pet food composition of the present invention is preferably used to treat and maintain dogs, cats, and horses, most preferably dogs.

Accordingly, it is a feature of the present invention to provide a pet food product which will alleviate gastrointestinal disorders by supplying a fermentable fiber source which provides the gastrointestinal tract with a preferred energy source to restore natural gastrointestinal function.

DETAILED DESCRIPTION OF THE PREFERRED EMBODIMENTS

The present invention comprises a pet food composition containing fermentable fibers which display certain organic matter disappearance percentages. The pet food composition can be any suitable pet food formula which also provides adequate nutrition for the animal. For example, a typical canine diet for use in the present invention may contain about 30% crude protein, about 20% fat, and about 10% total dietary fiber. However, no specific ratios or percentages of these other nutrients are required.

The fermentable fiber of the present invention may be any fiber source which intestinal bacteria present in the animal can ferment to produce significant quantities of SCFAs. "Significant quantities" of SCFAs, for purposes of this invention, are amounts over 0.5 mmol of total SCFAs/gram of substrate in a 24 hour period. Preferred fibers are beet pulp, citrus pulp, rice bran, carob bean, gum talha, and mixtures of these fibers. Beet pulp is the most preferred fiber because it provides a middle ground between the more highly fermentable fibers such as citrus pectin, which may promote mucus distension (see Example 3), and non-fermentable fibers such as cellulose, which do not produce a significant quantity of SCFAs and can promote cryptitis (see Example 3).

The fermentable fibers are used in the pet food composition in amounts from 3 to 9 weight percent of supplemental total dietary fiber, preferably 3 to 7 weight percent, and most preferably 4 to 7 weight percent.

A definition of "supplemental total dietary fiber" first requires an explanation of "total dietary fiber". "Total dietary fiber" is defined as the residue of plant food which is resistant to hydrolysis by animal digestive enzymes. The main components of total dietary fiber are cellulose, hemicellulose, pectin, lignin and gums (as opposed to "crude fiber", which only contains some forms of cellulose and lignin). "Supplemental total dietary fiber" is that dietary fiber which is added to a food product above and beyond any dietary fiber naturally present in other components of the food product. Also, a "fiber source" is considered such when it consists predominantly of fiber.

The fermentable fibers used in the present invention have an organic matter disappearance of from about 15 to 60 percent when fermented by fecal bacteria in vitro for a 24 hour period. That is, from about 15 to 60 percent of the total organic matter originally present is fermented and converted by the fecal bacteria. The organic matter disappearance of the fibers is preferably 30 to 50 percent, and most preferably is 30 to 40 percent.

The fermentable fibers of the present invention can also be described by their fermentability rates when processed by a living animal (in vivo). These rates are expressed as "digestibility of TDF" (see Tables 4 and 5). Fermentable fibers which can be used in the present invention have fermentability/digestibility rates (in vivo) of 20 to 60 percent, preferably 25 to 50 percent, and most preferably 25 to 40 percent.

The present invention can be used with any pet animal to treat gastrointestinal disorders and to restore and maintain the health of normal animals. However, it is preferred to use the pet food product of the invention with dogs, cats, and horses. Dogs are the most preferred animals.

In order that the invention may be more readily understood, reference is made to the following examples which are intended to illustrate the invention, but not limit the scope thereof.

EXAMPLE 1

An in vitro experiment was conducted to determine the fermentability of fibrous substrates by dog fecal microflora. Feces from three female English Pointers were used as the inoculum source of anaerobic microflora. Substrates were fermented for 24 hours and then the concentrations of various short-chain fatty acids were determined. The results are shown in Table 1. The data shows that Solka Floc (a cellulose source) was essentially non-fermentable with an insignificant quantity of SCFAs being produced while lactulose was the most fermentable fiber. Fibers within the scope of the present invention, such as gum karaya, xanthan gum, gum arabic, beet pulp, gum talha, and carob bean produced moderate quantities of SCFAs, intermediate to that produced by the Solka Floc and lactulose. Also, beet pulp produced the highest quantity of butyrate, which is the preferred substrate for colonocytes.

TABLE 1

Short-Chain Fatty Acids produced by dog fecal bacteria on various fiber substrates in a 24 hour period

| Fiber Substrate | Short-Chain Fatty Acid (mmol/g organic matter) | | | |
|---|---|---|---|---|
| | Acetate | Propionate | Butyrate | Total SCFA |
| Solka Floc | 0.09 | 0.05 | 0.00 | 0.14 |
| Oat Fiber | 0.19 | 0.14 | 0.03 | 0.35 |
| Gum Karaya | 0.61 | 0.01 | 0.02 | 0.64 |
| Xanthan Gum | 0.80 | 0.10 | 0.05 | 0.95 |
| Gum Arabic | 0.62 | 0.47 | 0.40 | 1.49 |
| Beet Pulp | 2.03 | 0.80 | 0.70 | 3.01 |
| Gum Talha | 0.71 | 0.97 | 0.60 | 2.28 |
| Carob Bean | 2.10 | 1.44 | 0.65 | 4.19 |
| Locust Bean | 2.60 | 2.70 | 0.52 | 5.81 |
| FOS[1] | 2.86 | 2.52 | 0.30 | 5.67 |
| Pectin | 4.54 | 1.76 | 0.54 | 6.84 |
| Guar Gum | 3.07 | 3.79 | 0.41 | 7.26 |
| Lactulose | 3.47 | 4.52 | 0.35 | 8.34 |

[1]Fructooligosaccharides

EXAMPLE 2

An in vitro experiment was conducted to determine the fermentability of fibrous substrates by cat fecal microflora. Feces from one female and two male shorthairs were used as the inoculum source of anaerobic microflora. Substrates were fermented for 24 hours and then the concentrations of various short-chain fatty acids were determined. The results are shown in Table 2. The data shows that Solka Floc (a cellulose source) was essentially non-fermentable with an insignificant quantity of SCFAs being produced while pectin was the most fermentable fiber. Fibers within the scope of the present invention, such as xanthan gum, gum karaya, gum arabic, gum talha, rice bran, beet pulp, and carob bean produced moderate quantities of SCFAs, intermediate to that produced by the Solka Floc and pectin.

TABLE 2

Short-Chain Fatty Acids produced by cat fecal bacteria on various fiber substrates in a 24 hour period

| Fiber Substrate | Short-Chain Fatty Acid (mmol/g organic matter) | | | |
|---|---|---|---|---|
| | Acetate | Propionate | Butyrate | Total SCFA |
| Solka Floc | 0.03 | 0.04 | 0.01 | 0.07 |
| Xanthan Gum | 0.42 | 0.09 | 0.02 | 0.53 |
| Gum Karaya | 0.75 | 0.10 | 0.04 | 0.89 |
| Gum Arabic | 1.02 | 0.63 | 0.04 | 1.69 |
| Gum Talha | 0.85 | 0.91 | 0.07 | 1.83 |
| Rice Bran | 1.03 | 0.73 | 0.21 | 1.98 |
| Beet Pulp | 1.42 | 0.51 | 0.08 | 2.01 |
| Carob Bean | 2.22 | 1.38 | 0.26 | 3.85 |
| Locust Bean | 3.02 | 1.81 | 0.30 | 5.10 |
| Guar Gum | 2.93 | 2.04 | 0.23 | 5.20 |
| Pectin | 4.38 | 1.51 | 0.34 | 6.20 |

EXAMPLE 3

In vitro experiments were conducted to determine the percentage of organic matter disappearance (OMD) of fibrous substrates when exposed to dog and cat fecal microflora. Three female English Pointers provided the fecal samples for the dog anaerobic microflora. Feces from one female and two male shorthairs were used as the inoculum source of the cat anaerobic microflora. The amount of organic matter was determined for various substrates. Then, these substrates were fermented for 24 hours and the amount of organic matter remaining was determined. The results, given as the percentage of OMD, are shown in Table 3. The data shows that Solka Floc (a cellulose source) had the smallest percentage of OMD while citrus pectin had the highest. Fibers within the scope of the present invention, such as beet pulp, citrus pulp, carob bean, and gum talha had intermediate OMD percentages.

TABLE 3

The Organic Matter Disappearance (%) of various substrates after being subjected to Dog and Cat Fecal Microflora for 24 hours

| Substrate | Dog Microflora | Cat Microflora |
|---|---|---|
| Solka Floc | 4.3 | 1.2 |
| Gum Karaya | 18.5 | 27.9 |
| Xanthan Gum | 28.0 | 21.1 |
| Gum Arabic | 24.6 | 28.5 |
| Beet Pulp | 38.2 | 35.0 |
| Gum Talha | 36.3 | 35.3 |
| Citrus Pulp | 44.3 | — |
| Carob Bean Gum | 49.8 | 47.8 |
| Locust Bean Gum | 61.7 | 72.2 |
| Guar Gum | 75.3 | 74.3 |
| Citrus Pectin | 84.9 | 83.8 |

EXAMPLE 4

Thirty adult English Pointers were grouped by weight and sex and randomly assigned to one of six diets. Diets were formulated to contain 7.5% supplemental total dietary fiber (TDF) and contained the following fiber sources: beet pulp (BP), cellulose (CE), citrus pulp (CP), combination blend (CB: 80% beet pulp, 10% citrus pectin, 10% guar), short chain fatty acid blend (SC: 40% citrus pectin, 20% gum talha, 20% carob, 20% locust bean), and stool blend (SB:75% cellulose, 25% gum arabic). The stool blend treatment was designed to minimize fermentation and promote fecal bulking. The short chain fatty acid blend was designed to stimulate fermentation, however this resulted in greatly reduced stool quality (loose, liquid diarrhea). The combination blend was designed to provide moderate fermentation and desirable stool quality. Three of the groups are fibers within the scope of the present invention, BP, CP, and CB. Dogs were adapted to diets for 12 days and total feces were collected on day 13 through 17. On day 18, the dogs were dosed with chromium-mordanted NDF and fecal samples were collected every 4 hours after dosing for 60 hours. The collected feces were scored for consistency using the following rating system: 1=hard, dry pellets: small, hard mass; 2=hard, formed dry stool: remains firm and soft; 3=soft, formed, moist: softer stool that retains its shape; 4=soft, unformed: stool assumes shape of container, pudding-like; 5=watery: liquid that can be poured. The resulting data, represented by an average of the scores throughout the testing period, are given as "fecal characteristics" in Table 4.

The results are shown in Table 4. Dogs consuming the diet with the greatest TDF digestibility (SC) had poor fecal characteristics, producing excessively soft stools. Dogs consuming the diet with the lowest TDF digestibility (SB) were among the dogs with the lowest value for fecal characteristics. These dogs produced hard, dry stools which may result in constipation and straining issues while defecating.

TABLE 4

Nutrient Digestibility, Passage and Fecal Characteristics of Dogs Fed Various Fiber-Containing Diets

|    | Digestibility of dry matter (percentage digested) | Digestibility of TDF (percentage digested) | Grams of Wet Feces/ Grams TDF Intake | Fecal Characteristics |
|----|---|---|---|---|
| BP | 82.2− | 29.0 | 8.2+ | 2.8 |
| CE | 83.8 | 11.0 | 3.6− | 2.4− |
| CP | 82.3 | 43.0 | 6.6 | 2.9 |
| CB | 84.3 | 51.3 | 6.7 | 3.1 |
| SC | 87.3+ | 60.8+ | 4.9 | 3.7+ |
| SB | 82.7 | 4.1− | 3.9 | 2.5 |

"+" indicates the highest amount/percentage.
"−" indicates the lowest amount/percentage.

EXAMPLE 5

Twenty-nine domestic short-hair female cats and one medium-hair female cat were used in an experiment to evaluate the effects of incorporating selected fibers into cat diets. Cats were grouped by weight and then randomly assigned to one of six diets. One group was assigned to a diet with no supplemental fiber (NF). The remaining cats were fed diets containing similar amount of supplemental fiber. Approximately 7.5 supplemental total dietary fiber (TDF) was added to each diet. Sources of supplemental fiber were beet pulp (BP), cellulose (CE), combination blend (CB: 80% beet pulp, 10% citrus pectin, 10% guar), short chain fatty acid blend (SC: 40% citrus pectin, 20% gum talha, 20% carob, 20% locust bean), and stool blend (SB: 75% cellulose, 25% gum arabic). The stool blend treatment was designed to minimize fermentation and promote fecal bulking. The short chain fatty acid blend was designed to stimulate fermentation, however this resulted in greatly reduced stool quality (loose, liquid diarrhea). The combination blend was designed to provide moderate fermentation and desirable stool quality. Two of the groups are fibers within the scope of the present invention, BP and CB. Cats were adapted to diets for 8 days and total feces were collected on day 9 through 14. The collected feces were scored for consistency using the following rating system: 1=hard, dry pellets: small, hard mass; 2=hard, formed dry stool: remains firm and soft; 3=soft, formed, moist: softer stool that retains its shape; 4=soft, unformed: stool assumes shape of container, pudding-like; 5=watery: liquid that can be poured. The resulting data, represented by an average of the scores throughout the testing period, are given as "fecal characteristics" in Table 5.

The results are shown in Table 5. Cats consuming the diet with the greatest TDF digestibility (SC) had poor fecal characteristics, producing excessively soft stools. Also, these cats had poor digestibility of both proteins and lipids.

TABLE 5

Nutrient Digestibility and Fecal Characteristics of Cats Fed Various Fiber-Containing Diets

|    | Digestibility of TDF (percentage digested) | Digestibility of protein (percentage digested) | Digestibility of lipids (percentage digested) | Fecal Characteristics |
|----|---|---|---|---|
| NF | 5.3− | 86.7 | 93.9 | 2.1 |
| BP | 38.2 | 83.3 | 91.5 | 2.3 |
| CE | 8.9 | 88.4+ | 95.0 | 1.8− |
| SB | 5.7 | 86.0 | 95.9+ | 2.3 |
| SC | 50.6+ | 59.0− | 39.6− | 4.2+ |
| CB | 41.1 | 83.2 | 88.7 | 2.8 |

"+" indicates the highest value/percentage.
"−" indicates the lowest value/percentage.

EXAMPLE 6

Fifteen adult beagle dogs were divided into three groups and fed diets containing a different dietary fiber. The three sources of supplemental dietary fiber used were cellulose, pectin/gum arabic, and a fiber source within the scope of the present invention, beet pulp. The dogs were maintained on the diets for a minimum of two weeks prior to experimentation. The diets were formulated to contain 31% crude protein, 9% TDF (total dietary fiber), and 21% fat.

Examination of the dogs revealed differences in the occurrence of gastrointestinal disorders depending on the dietary fiber. The specific problems that were examined were mucus distension of colonic crypts, exfoliation (excess loss of epithelial cells causing irregularity of the mucosal surface), and cryptitis (accumulation of inflammatory cells and/or necrotic crypt enterocytes). Histopathological determination was conducted by examination of three tissues from each segment of colon, and from each dog. In addition, three to five random sites were examined on each tissue. Thus, there were 9 to 15 observations per colonic segment, and 27 to 45 observations per dog. Dogs were designated as having colonic mucus distension, exfoliation or cryptitis if the histopathological disturbance was observed at two or more sites within a segment of bowel. The results are shown in Table 6.

The data shows that diets containing the non-fermentable cellulose fiber resulted in a high incidence (80%) of cryptitis. Also, diets containing the highly fermentable pectin/arabic fiber resulted in a high incidence (80%) of mucus distension. Diets containing beet pulp, which has an intermediate fermentability, demonstrated the fewest amount of gastrointestinal disorders.

TABLE 6

Percentage of dogs demonstrating gastrointestinal disorders when fed various dietary fibers

| | Dietary Fiber | | |
|---|---|---|---|
| | Cellulose | Pectin/Arabic | Beet Pulp |
| Mucus Distension | 40% | 80% | 20% |
| Exfoliation | 20% | 40% | 20% |
| Cryptitis | 80% | 60% | 20% |

EXAMPLE 7

An in vitro experiment was conducted to determine the fermentability of selected fiber sources by dog fecal microflora. Inocula came from dogs adapted to either a non-fermentable fiber-containing diet (Solka Floc, a cellulose source) or a fermentable fiber-containing diet (citrus pulp) within the scope of the present invention.

Feces from three English Pointers adapted to each diet were used as a source of microflora to evaluate short-chain fatty acid (SCFA) production from carob bean, citrus pulp, and citrus pectin substrates. The substrates were fermented for 6 and 12 hours. The results are shown in Tables 7 and 8. The data indicates that acetate and total SCFA production was significantly greater after 6 and 12 hours of fermentation from dogs consuming the citrus pulp-containing diet, and may indicate that cellulose (Solka Floc) causes a depression in microbial activity.

TABLE 7

Acetate production (mmol/gram of organic matter) of Solka Floc and Citrus Pulp fibers on various substrates

| | Solka Floc fiber Incubation time (hours) | | Citrus Pulp fiber Incubation time (hours) | |
|---|---|---|---|---|
| | 6 | 12 | 6 | 12 |
| Carob bean substrate | 0.38 | 1.00 | 0.61 | 0.47 |
| Citrus pulp substrate | 0.59 | 1.39 | 1.28 | 2.00 |
| Pectin substrate | 0.54 | 1.54 | 1.15 | 3.02 |

TABLE 8

Total SCFA production (mmol/gram of organic matter) of Solka Floc and Citrus Pulp fibers on various substrates

| | Solka Floc fiber Incubation time (hours) | | Citrus Pulp fiber Incubation time (hours) | |
|---|---|---|---|---|
| | 6 | 12 | 6 | 12 |
| Citrus pulp substrate | 0.81 | 1.88 | 2.08 | 2.72 |
| Pectin substrate | 0.72 | 2.07 | 1.51 | 4.17 |

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A pet food product for use in maintaining normal gastrointestinal function and ameliorating chronic diarrhea in pet animals by providing short chain fatty acids in the gastrointestinal tract of said pet animals comprising a pet food composition containing fermentable fibers which have an organic matter disappearance of 15 to 60 weight percent when fermented by fecal bacteria for a 24 hour period, said fermentable fibers being present in amounts from 3 to 9 weight percent of supplemental total dietary fiber.

2. The pet food product of claim 1 wherein said pet food composition contains from 3 to 7 weight percent of supplemental total dietary fiber of said fermentable fibers.

3. The pet food product of claim 2 wherein said pet food composition contains from 4 to 7 weight percent of supplemental total dietary fiber of said fermentable fibers.

4. The pet food product of claim 1 wherein said fermentable fibers have an organic matter disappearance of 30 to 50 percent.

5. The pet food product of claim 4 wherein said fermentable fibers have an organic matter disappearance of 30 to 40 percent.

6. The pet food product of claim 1 wherein said fermentable fibers are selected from the group consisting of beet pulp, citrus pulp, rice bran, carob bean, gum talha, and mixtures thereof.

7. The pet food product of claim 6 wherein said fermentable fibers are beet pulp.

8. A process for maintaining normal gastrointestinal function and ameliorating chronic diarrhea in pet animals comprising providing short chain fatty acids in the gastrointestinal tract of a pet animal by feeding said pet animal a diet consisting essentially of a pet food composition containing fermentable fibers which have an organic matter disappearance of 15 to 60 weight percent when fermented by fecal bacteria for a 24 hour period, said fermentable fibers being present in amounts from 3 to 9 weight percent of supplemental total dietary fiber.

9. The process of claim 8 wherein said pet food composition contains from 3 to 7 weight percent of supplemental total dietary fiber of said fermentable fibers.

10. The process of claim 9 wherein said pet food composition contains from 4 to 7 weight percent of supplemental total dietary fiber of said fermentable fibers.

11. The process of claim 8 wherein said fermentable fibers have an organic matter disappearance of 30 to 50 percent.

12. The process of claim 11 wherein said fermentable fibers have an organic matter disappearance of 30 to 40 percent.

13. The process of claim 8 wherein said fermentable fibers are selected from the group consisting of beet pulp, citrus pulp, rice bran, carob bean, gum talha, and mixtures thereof.

14. The process of claim 13 wherein said fermentable fibers are beet pulp.

15. The process of claim 8 wherein said pet animal is selected from the group consisting of dogs, cats, and horses.

16. The process of claim 15 wherein said pet animal is a dog.

* * * * *

Disclaimer and Dedication 5,616,569—Gregory A. Reinhart, Dayton, Ohio. PET FOOD PRODUCT CONTAINING FERMENTABLE FIBERS AND PROCESS FOR TREATING GASTROINTESTINAL DISORDERS. Patent dated April 1, 1997. Disclaimer and Dedication filed June 16, 1997, by the assignee, The Iams Co.

Hereby disclaims and dedicates to the Public claims 1-7 of said patent.
*(Official Gazette,* December 9, 1997)